United States Patent [19]

Gentile

[11] Patent Number: 5,289,949
[45] Date of Patent: Mar. 1, 1994

[54] MULTI-CAVITY DISPENSING REFILL CARTRIDGE

[75] Inventor: James L. Gentile, Orange, Conn.

[73] Assignee: Chesebrough-Pond's USA Co., Division of Conopco, Inc., Greenwich, Conn.

[21] Appl. No.: 901,670

[22] Filed: Jun. 22, 1992

[51] Int. Cl.$^5$ .............................................. B67D 5/52
[52] U.S. Cl. .................................. 222/137; 222/153; 222/327; 222/386
[58] Field of Search ............... 222/137, 327, 153, 135, 222/136, 326, 386; 221/152, 154, 197; 92/239, 248, 253

[56] References Cited

U.S. PATENT DOCUMENTS

| | | | |
|---|---|---|---|
| 825,680 | 7/1906 | Raymond | 215/6 |
| 1,363,064 | 12/1920 | Stegath | 222/91 |
| 1,698,404 | 1/1929 | Hopkins | 222/94 |
| 1,699,532 | 1/1929 | Hopkins | 222/94 |
| 1,736,264 | 11/1929 | Johnson | 215/6 |
| 2,058,251 | 10/1936 | Nitardy et al. | 221/60 |
| 2,166,307 | 7/1939 | Libby | 221/60 |
| 2,376,944 | 5/1945 | Songer | 222/327 |
| 2,661,871 | 12/1953 | Huenergardt | 222/129 |
| 2,752,920 | 7/1956 | Kurkjian | 128/261 |
| 2,789,731 | 4/1957 | Marraffino | 222/129 |
| 2,819,723 | 1/1958 | Meyer | 132/116 |
| 2,918,199 | 12/1959 | Marraffino | 222/1 |
| 2,925,938 | 2/1960 | Parsons | 222/94 |
| 2,944,704 | 7/1960 | Taylor, Jr. | 222/94 |
| 2,944,705 | 7/1960 | Strumor | 222/94 |
| 2,954,144 | 9/1960 | Elam et al. | 222/82 |
| 2,959,327 | 11/1960 | Bloom | 222/94 |
| 2,973,883 | 3/1961 | Modderno | 222/94 |
| 3,105,615 | 10/1963 | Koga | 222/94 |
| 3,166,221 | 1/1965 | Nielsen | 222/137 |
| 3,179,290 | 4/1965 | Whitney | 222/1 |
| 3,188,056 | 6/1965 | Trumbull et al. | 259/37 |
| 3,197,071 | 7/1965 | Kuster | 222/94 |
| 3,200,995 | 8/1965 | Gangwisch | 222/94 |
| 3,217,931 | 11/1965 | Farrar et al. | 222/94 |
| 3,266,671 | 8/1966 | Gelpey | 222/94 |
| 3,310,201 | 3/1967 | Guarr et al. | 222/197 |
| 3,326,416 | 6/1967 | Hayes | 222/4 |
| 3,335,912 | 8/1967 | Reeves, Jr. | 222/94 |
| 3,442,424 | 5/1969 | Prussin et al. | 222/81 |
| 3,455,489 | 7/1969 | Meshberg | 222/94 |
| 3,458,076 | 7/1969 | Babcock | 215/16 |
| 3,486,661 | 12/1969 | Friedrich et al. | 222/95 |
| 3,490,651 | 1/1970 | Abplanalp | 222/94 |
| 3,499,387 | 3/1970 | Zippel | 103/38 |
| 3,503,539 | 3/1970 | O'Donnell | 222/95 |
| 3,506,157 | 4/1970 | Dukess | 222/94 |
| 3,508,682 | 4/1970 | Hollis et al. | 222/48 |
| 3,525,997 | 8/1970 | O'Donnell | 222/95 |
| 3,532,254 | 10/1970 | Burke | 222/94 |
| 3,540,623 | 11/1970 | Wittke et al. | 222/94 |
| 3,543,966 | 12/1970 | Ryan et al. | 222/94 |
| 3,570,719 | 3/1971 | Schiff | 222/137 |
| 3,591,054 | 7/1971 | Miles | 222/135 |
| 3,599,838 | 8/1971 | LaVange | 222/129 |
| 3,603,485 | 9/1971 | Vivier | 222/129 |

(List continued on next page.)

FOREIGN PATENT DOCUMENTS

| | | | |
|---|---|---|---|
| 294672 | 12/1988 | European Pat. Off. | |
| 0351441 | 1/1990 | European Pat. Off. | 222/327 |
| 2095844 | 11/1972 | France | |
| 2020754 | 11/1979 | United Kingdom | 222/327 |

*Primary Examiner*—Andres Kashnikow
*Assistant Examiner*—Anthoula Pomrening
*Attorney, Agent, or Firm*—Brumbaugh, Graves, Donohue & Raymond

[57] ABSTRACT

A multi-cavity dispensing refill cartridge to be used with a reusable base. The refill cartridge has two hollow, separate parallel cylinders for containing flowable material. The cylinders have a first generally closed end and a second end which accommodates piston heads. The piston heads are compressably engageable with piston rods of the reusable base. Relative compression of the piston heads and cylinders cause flowable material to flow toward the first end of the cylinders and towards the outlet in the closed end. The outlet include means for causing the flowable materials to flow toward each other at the outlet opening. The refill cartridge is provides with means for selectively, engaging the reusable base.

13 Claims, 4 Drawing Sheets

U.S. PATENT DOCUMENTS

| | | | |
|---|---|---|---|
| 3,608,782 | 9/1971 | Sathicq | 222/94 |
| 3,613,956 | 10/1971 | McCulloch | 222/136 |
| 3,630,415 | 12/1971 | Morane et al. | 222/129 |
| 3,651,931 | 3/1972 | Hsiung | 206/47 A |
| 3,672,544 | 6/1072 | Marand | 222/94 |
| 3,710,984 | 1/1973 | Webster | 222/145 |
| 3,721,848 | 5/1973 | Nakanishi | 222/129 |
| 3,735,900 | 5/1973 | Gores | 222/145 |
| 3,747,804 | 7/1973 | Raaf et al. | 222/1 |
| 3,767,078 | 10/1973 | Gortz et al. | 220/63 R |
| 3,788,520 | 1/1974 | Dukess | 222/94 |
| 3,799,398 | 3/1974 | Morane et al. | 222/39 |
| 3,814,287 | 6/1974 | Darbon et al. | 222/94 |
| 3,814,298 | 6/1974 | Hansen | 222/153 |
| 3,850,346 | 11/1974 | Richardson et al. | 222/145 |
| 3,870,147 | 3/1975 | Orth | 206/222 |
| 3,876,111 | 4/1975 | Swain | 222/94 |
| 3,885,710 | 5/1975 | Cohen | 222/145 |
| 3,918,612 | 11/1975 | Voulgaris | 222/144 |
| 3,931,912 | 1/1976 | Hsung | 222/94 |
| 3,964,643 | 6/1976 | Morane et al. | 222/145 |
| 3,966,090 | 6/1976 | Prussin et al. | 222/94 |
| 3,980,222 | 9/1976 | Hood | 229/32 |
| 4,010,872 | 3/1977 | Lozano et al. | 222/94 |
| 4,014,463 | 3/1977 | Hermann | 222/145 |
| 4,040,420 | 8/1977 | Speer | 128/218 M |
| 4,046,288 | 9/1977 | Bergman | 222/135 |
| 4,062,475 | 12/1977 | Harris et al. | 222/95 |
| 4,062,477 | 12/1977 | Morane | 222/145 |
| 4,073,406 | 2/1978 | Goncalves | 222/94 |
| 4,089,437 | 5/1978 | Chutter et al. | 222/94 |
| 4,098,435 | 7/1978 | Weyn | 222/94 |
| 4,121,739 | 10/1978 | Devaney et al. | 222/137 |
| 4,159,066 | 6/1979 | Silver | 222/129 |
| 4,240,566 | 12/1980 | Bergman | 222/135 |
| 4,261,481 | 4/1981 | Speer | 222/135 |
| 4,271,984 | 6/1981 | Ducros et al. | 222/94 |
| 4,344,919 | 8/1982 | Kelterbaum | 422/133 |
| 4,360,130 | 11/1982 | Nishimura et al. | 222/153 |
| 4,457,454 | 7/1984 | Meshberg | 222/95 |
| 4,460,109 | 7/1984 | Ducros et al. | 222/94 |
| 4,461,403 | 7/1984 | Prahs | 222/129 |
| 4,463,875 | 8/1984 | Tepic | 222/82 |
| 4,471,888 | 9/1984 | Herb et al. | 222/137 |
| 4,487,757 | 12/1984 | Kiozpeoplou | 424/7.1 |
| 4,509,641 | 4/1985 | Scieri et al. | 206/219 |
| 4,528,180 | 7/1985 | Schaeffer | 424/52 |
| 4,566,610 | 1/1986 | Herb | 222/137 |
| 4,582,224 | 4/1986 | Proksa et al. | 222/135 |
| 4,585,149 | 4/1986 | Zulauf | 222/94 |
| 4,687,663 | 8/1987 | Schaeffer | 424/52 |
| 4,742,940 | 5/1988 | Wilkinson | 222/162 |
| 4,747,517 | 5/1988 | Hart | 222/327 X |
| 4,767,026 | 8/1988 | Keller et al. | 222/137 |
| 4,771,919 | 9/1988 | Ernst | 222/145 X |
| 4,813,871 | 3/1989 | Friedman | 433/90 |
| 4,834,268 | 5/1989 | Keller | 222/327 |
| 4,854,485 | 8/1989 | Collins | 222/327 X |
| 4,869,394 | 9/1989 | Hurst | 222/197 |
| 4,949,873 | 8/1990 | Maeder | 222/386 X |
| 4,964,539 | 10/1990 | Mueller | 222/94 |
| 4,974,756 | 12/1990 | Pearson et al. | 222/145 |
| 4,981,241 | 1/1991 | Keller | 222/137 |
| 5,020,694 | 6/1991 | Pettengill | 222/137 |
| 5,038,963 | 8/1991 | Pettengill et al. | 222/145 |
| 5,065,906 | 11/1991 | Maeder | 222/327 X |

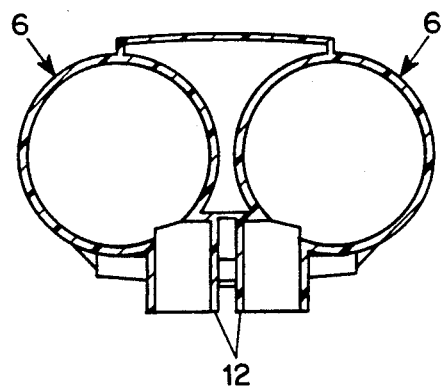
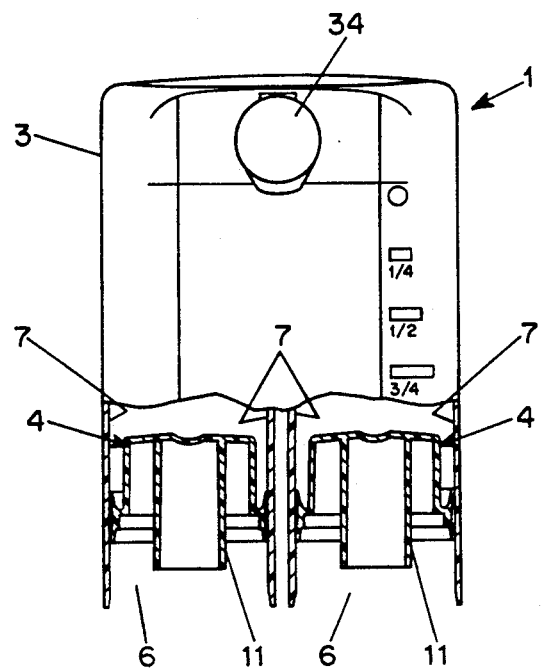
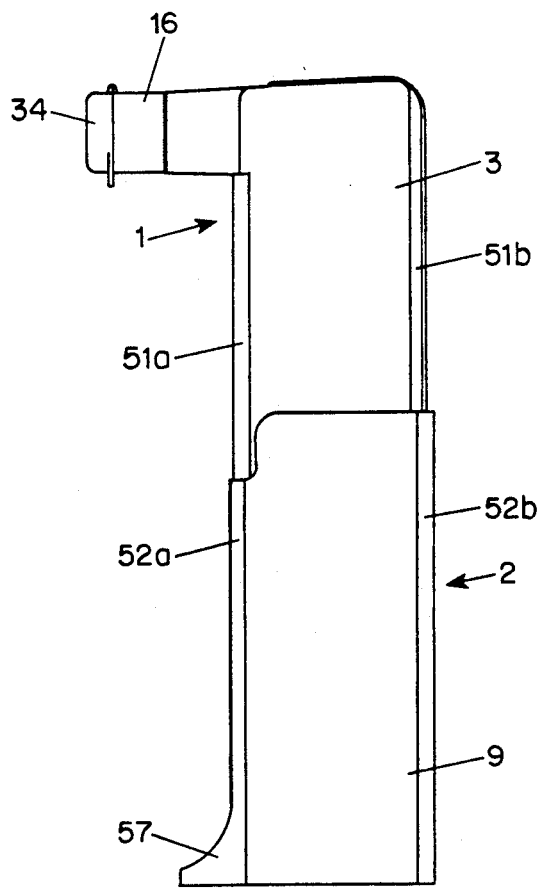
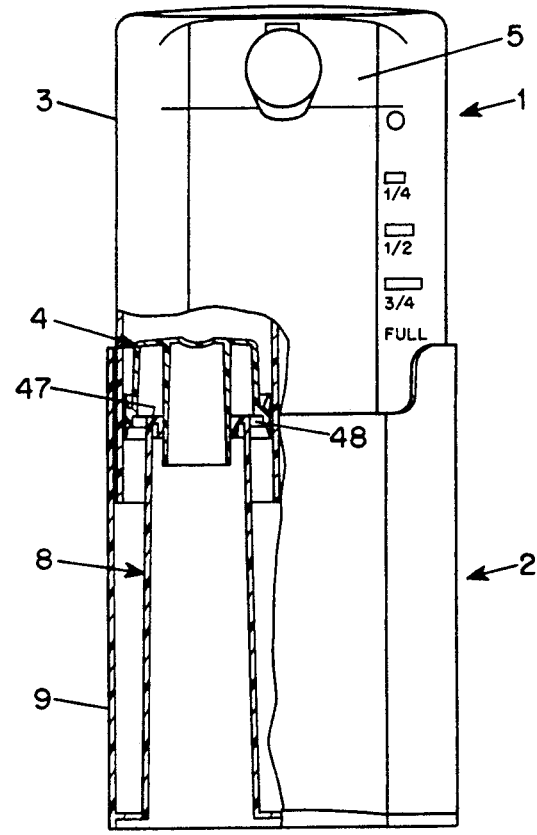

MULTI-CAVITY DISPENSING REFILL CARTRIDGE

BACKGROUND OF THE INVENTION

The present invention relates to rigid telescopically arranged multi-cavity dispensing containers for flowable material, such as tooth paste and the like, from which it is desired to dispense simultaneously two or more reactive substances which require separate storage until time of use. More particularly it relates to a disposable refill cartridge for use in a dispensing container of the above type which can be used in conjunction with a reusable base.

There exists a desire to provide sodium bicarbonate and peroxide gel as components of toothpaste. Sodium bicarbonate is a well known and commonly used abrasive and cleaner. Peroxide gel is regarded as a beneficial ingredient to help promote healthy gums. These components are reactive when mixed, and therefore must be maintained separately until time of use.

U.S Pat. Nos. 5,020,694 to Pettengill and U.S. Pat. No. 5,038,963, to Pettengill and Gentile, which are hereby incorporated by reference, disclose rigid piston type multi-cavity dispensing containers for the simultaneous coextrusion in predetermined proportions of two or more materials which may have different rheologies. The lower body members have a base and two or more pistons attached thereto. The upper body members have parallel cylinders for containing the flowable materials and outlet means for dispensing the materials. The lower end of the cylinders receive the pistons whereby the relative compression of upper and lower body members forces the flowable materials out through the outlet means. This produces a single, banded unmixed stream of material that can be neatly and easily applied onto the narrow width of a toothbrush. The upper and lower members cannot be sold as separate independent units because the pistons of the lower member are needed to seal the flowable material within the upper member. In addition ridges formed on both the upper and lower body members prevent them from being pulled apart. Thus both upper and lower body members must be discarded after the contents of dispenser are used up. This produces unnecessary waste and is not the most economical of arrangements.

Thus it is an object of this invention, for ecological and economical reasons, to provide a multi-cavity dispensing refill cartridge which can be used in conjunction with a reusable base for the simultaneous coextrusion, in predetermined portions, of two or more flowable materials, which may have different rheologies, upon the relative compression of the refill cartridge and the reusable base, to produce a single, banded unmixed stream of material that can neatly and easily be applied onto the narrow width of a toothbrush. It is a further object to provide such a refill cartridge which, in conjunction with a reusable base, dispenses a single stream of unmixed material and which provides segregation of the component materials within the dispenser both prior to and after dispensing.

SUMMARY OF THE INVENTION

In accordance with the present invention there is provided a multi-cavity dispensing refill cartridge, for use with a reusable base for the simultaneous coextrusion of at least two flowable materials. The refill cartridge includes at least two hollow and separate parallel cylinders each having a generally closed first end and a second end which telescopically and slidingly accommodates a piston head. The piston heads conform to ride sealingly along the interior walls of the cylinders to force the flowable materials toward the first end of the cylinders upon relative compression of the cylinders and piston heads. The piston heads are compressably engageable with piston rods of a reusable base so that the relative compression of the refill cartridge and the reusable base causes the relative compression of the cylinders and the piston heads. The cylinders are provided with outlet channels communicating with an outlet means having adjacent outlet openings and means for causing the flowable materials to flow towards each other at the outlet openings to form a single, banded, unmixed stream of the materials.

A first catching ridge formed on the refill cartridge engages another catching ridge on the reusable base to prevent the unintended separation of the refill cartridge from the reusable base. The first catching ridge is located on a flexible portion of the refill cartridge so that the two catching ridges may be pressed apart to allow separation of the refill cartridge from the reusable base.

The cylinders may be incorporated in a shroud designed to conform with a shroud of the reusable base. In addition, the conforming shrouds may include corresponding longitudinal axial grooves and ridges for linearly guiding axial movement between the refill cartridge and the reusable base. In a preferred arrangement, the shroud of the refill cartridge fits within the shroud of the reusable base and the catching ridge of the refill cartridge is located on a longitudinal axial ridge of the refill cartridge, and the catching ridge of the reusable base is located on a longitudinal groove of the reusable base. In addition, in this preferred arrangement, the catching ridge of the refill cartridge has adjacent slots so that catching ridge can be pushed inward to allow the refill cartridge to be pulled apart from the reusable base.

For a better understanding of the present invention together with other and further objects, reference is made to the following description, taken in conjunction with the accompanying drawings, and its scope will be pointed out in the appended claims.

BRIEF DESCRIPTION OF THE DRAWINGS

FIG. 2 is a sectional view of the FIG. 1 upper shroud taken through the outlet channels.

FIG. 3 is a frontal cutaway view of the FIG. 1 refill cartridge.

FIG. 4 is a side view of a refill cartridge and reusable base having front and back guide means.

FIG. 5 is a frontal cutaway view of a refill cartridge mounted on a reusable base.

DETAILED DESCRIPTION

Figure 1:
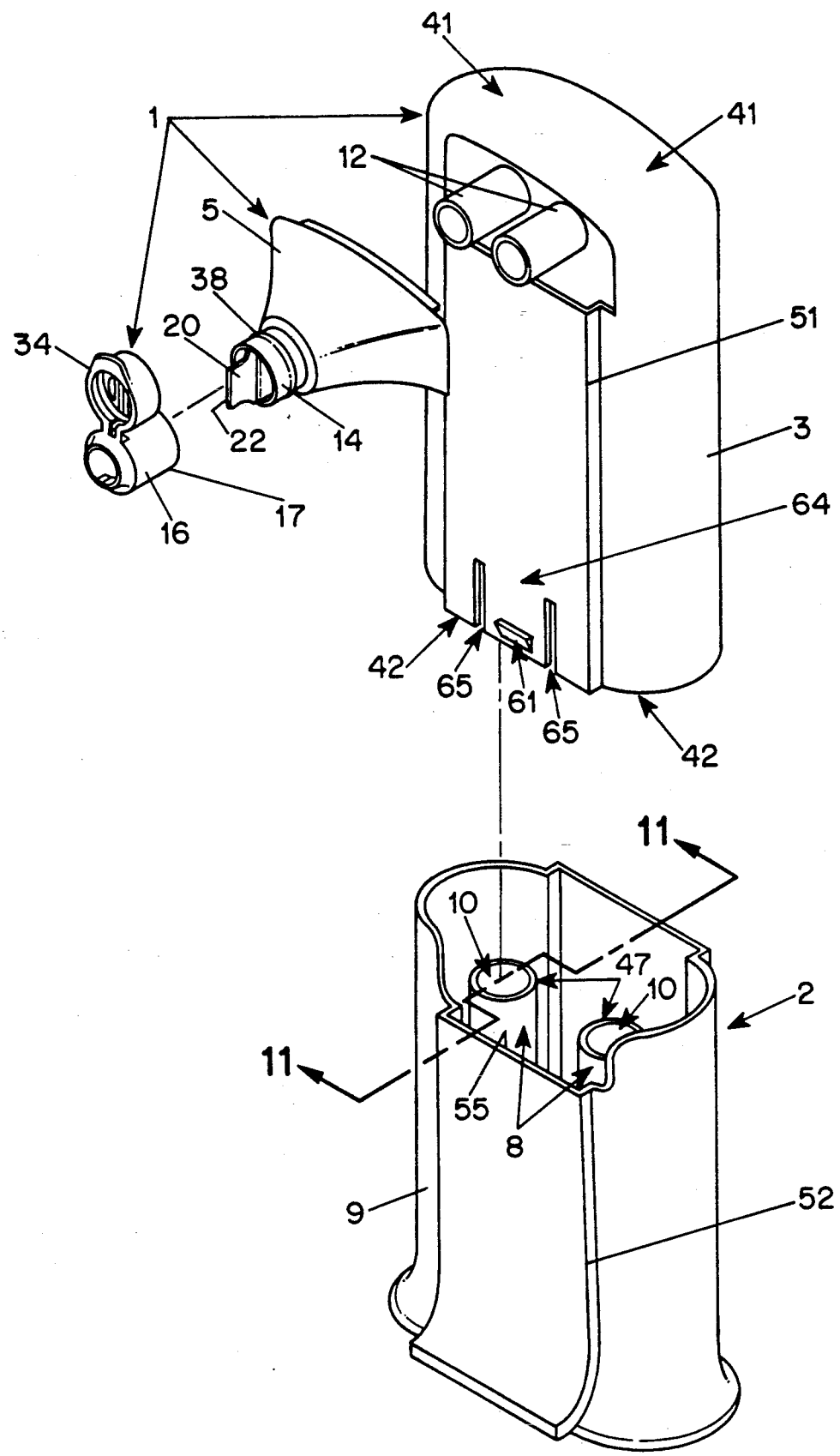
FIG. 1 is an exploded view of a multi-cavity dispensing refill cartridge and a reusable base to be used in conjunction therewith.

An exploded view of a multi-cavity dispensing refill cartridge 1 and a reusable base 2, to be used in conjunction therewith, is shown in FIG. 1. The refill dispensing cartridge 1 has a upper shroud 3 which incorporates two hollow, separate, parallel cylinders which each contain one of two reactive flowable materials. Two cylindrical outlet channels 12 provide fluid communication between the cylinders and outlet assembly 5. Hinged cap 34 seals the outlet assembly 5. A sectional view of the FIG. 1 shroud 3, taken through the center of the outlet channels 12, showing the two parallel cylinders 6, and their communication with the outlet channels 12, is shown in FIG. 2.

Referring back to FIG. 1, the top end 41 of each cylinder is generally closed except for the outlet channels 12. The bottom end 42 of each cylinder is sealed by a piston head. Thus the flowable materials are completely sealed within the refill cartridge allowing it to be handled and sold as a unit separate and independent from the reusable base 2.

Referring to FIG. 3, which is a frontal cutaway view of a refill cartridge, it can be seen that each cylinder 6 telescopically and slidingly accommodates a piston head 4 which conforms to ride sealingly within the inner walls 7 of the cylinders 6. Each piston head 4 has a central portion 11 designed to be received by openings in piston rods of the reusable base.

Figure 6A:
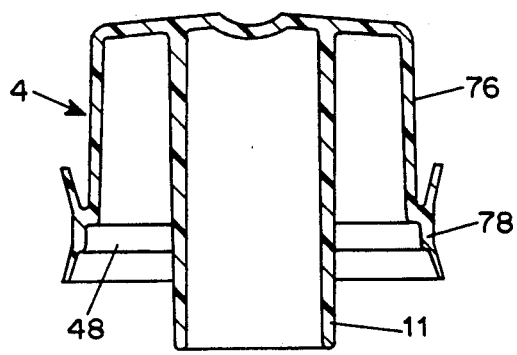
FIGS. 6a and 6b are respectively a sectional side view and a bottom view of a piston head.
Figure 6B:
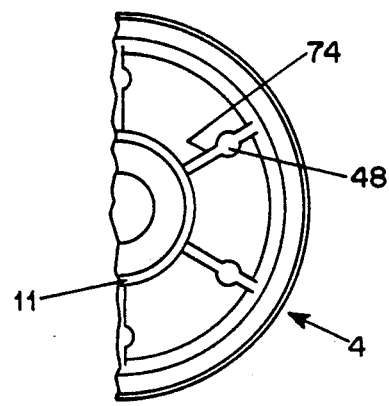

Referring back to FIG. 1 it can be seen that the reusable base 2 has a pair of parallel piston rods 8, with openings 10 designed to surround the lower portion 11 of the piston heads 4. The openings 10 are dimensioned as such that central portion 11 can easily slide into and out of them. This makes the piston heads 4 compressably engageable with piston rods 8. In other words, when the refill cartridge 1 and the reusable base 2 are compressed together, edge 47 of the piston rods 8 abuts and presses upon the bottom portion 48 of piston heads 4 as shown in FIG. 5. Referring to FIGS. 6a and 6b, which are respectively a sectional view from the side and bottom view of a piston head 4, it can be seen that ribs 74 extend between the cap portion 76 of piston head 4 and central portion 11. The bottom edges 48 of ribs 74 collectively engage the top edges 47 of piston rods 8. Ribs 74 also contribute to the structural stiffness of the piston heads 4.

When the refill cartridge and the reusable base are pulled apart, central portions 11 of the piston heads 4 slide easily out of openings 10. Thus the piston heads 4 only engage the piston rods 8 when refill cartridge 1 and reusable base 2 are compressed. Other compressably engageable arrangements are also possible. For example, the piston heads 4 could be provided with a flat bottom which could engage a flat top of the piston rods 8. The provision of lower portions 11 and openings 10, however, help to keep the piston heads properly oriented within the cylinders 6.

As shown in FIG. 1, reusable base 2 is dimensioned to telescopically receive refill cartridge 1. Specifically, upper shroud 3 is arranged to closely conform in sliding relation with lower shroud 9. The upper and lower shrouds 3 and 9 include means for guiding linear motion between the refill cartridge i and reusable base 2, shown as conforming longitudinal projecting ridges 51 and 52. These ridges are longitudinal, outward, rectangular extensions of the shrouds 3 and 9 having parallel side walls and flat facing surfaces. The projecting ridge 52 of the lower shroud 9, which forms an inner groove 55, is dimensioned to receive longitudinal ridge 51 of the upper shroud 3. When the two shrouds are assembled and compressed the longitudinal ridges 51 and 52 serve to guide the relative motion of the refill cartridge and the reusable base, preventing their relative rocking and providing smooth, equal, linear motion of the piston heads even where the materials in the two cylinders have different rheologies.

The shrouds 3 and 9 may be provided with longitudinal projecting ridges on both their front and back sides. These are shown as 51a, 51b, 52a, 52b in FIG. 4. In addition, front ridges 51a and 52a may have different widths than back ridges 51b and 52b. These then serve to orient the reusable base with respect to the refill cartridge. This is especially useful when the refill cartridge is to be used with a reusable base which has an extension such as extension 57 designed to prevent the forward tipping of the reusable base 2 and refill cartridge 1 when downward pressure is applied to the refill cartridge 1.

It is understood that the means for guiding linear motion between the refill cartridge and the reusable base may be of any acceptable shape and comprise a plurality of extensions, both inward and outward. In addition to providing guided relative motion of the shrouds, the extensions improve the mechanical rigidity of the shrouds.

Referring to FIG. 5, when refill cartridge 1 and the reusable base 2 are compressed, piston rods 8 simultaneously and equally push upwards the piston heads 4 thereby forcing the flowable reactive materials upwards and into the outlet channels 12 and through outlet assembly 5. Flowable materials from each of the outlet channels 12 is received by outlet assembly 5, shown in FIGS. 7 and 8, which provides for a forward facing dispensing nozzle. Outlet assembly 5 is fitted about outlet channels 12 and converges so as to end in an outlet passage 14. Outlet passage 14 has two passageways 15, each of which connects through one of the outlet channels 12 to one of the two cylinders 6. The outlet passage 14 of outlet assembly 5 is arranged to receive a separate nozzle 16, which together comprise the outlet means 17 as shown in FIG. 1.

Figure 7:
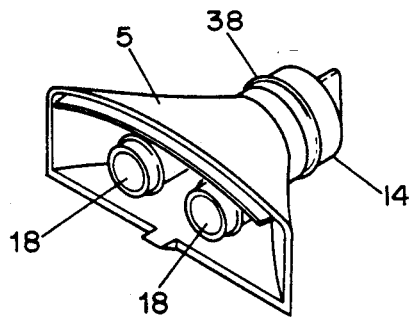
FIG. 7 is a perspective view of an outlet assembly.
Figure 8:
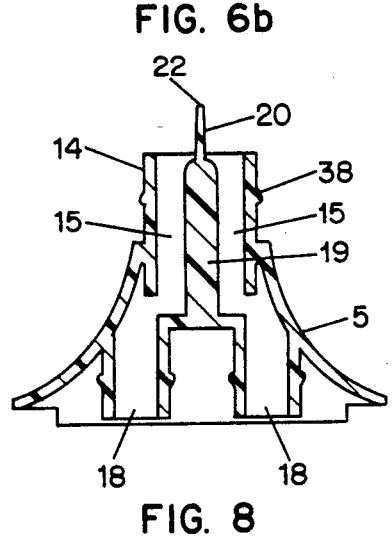
FIG. 8 is a sectional view of an outlet assembly.

The outlet channels 12 receive sleeves 18 of the out assembly 5 shown in FIGS. 7 and 8. As the tube sleeves 18 converge, they form a common rigid barrier 19. The outlet passage 14 is bisected by a flat rigid septum 20 extending from the barrier 19 and sitting fixedly within the inner walls of the outlet passage 14. The septum 20 is tapered cross-sectionally and ends in a straight edge 22. The cross-section of the septum edge 22 is a sharp angle approximated by a very small radius. The sides of the septum are preferably textured, for example by vapor honing, to a dull finish to promote adherence of the products thereto, which together with the taper causes the product streams to converge into a single stream as they emerge from adjacent outlet openings 23 shown in FIG. 9.

The septum 20 acts to keep the two reactive materials separate as they emerge from the cylinders 6 and also prevents reaction and obstruction of the outlet means 17 by reaction products. The flowable materials converge as they flow through the outlet means 17 but the two streams do not meet until they have fully left the outlet means opening 23. The taper design of the septum 20 causes the two streams to gradually converge until they meet at the septum edge 22 beyond the end of the outlet means opening 23. At this point they smoothly touch and continue to flow onto the intended surface, e.g. toothbrush, as a single, substantially cylindrical, banded stream. This stream is convenient and easy to direct with accuracy upon a limited surface area.

The diameter of the emerging stream may be regulated according to the packaging specifications. For example, nozzle 16, shown in FIGS. 1, 9 and 10, which snaps on around the outlet passage 14 by engaging ridge 38 may have an interior taper which reduces the effective outlet passage diameter as shown in FIG. 10. In such an embodiment, the length of the septum edge 22 is reduced and the side edges of the septum conform to the converging inner shape 35 of the nozzle 16.

Figure 9:
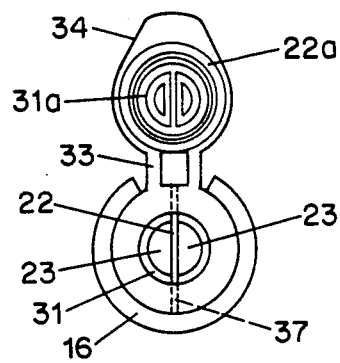
FIG. 9 is a frontal view of a nozzle with an opened, hinged cap.
Figure 10:
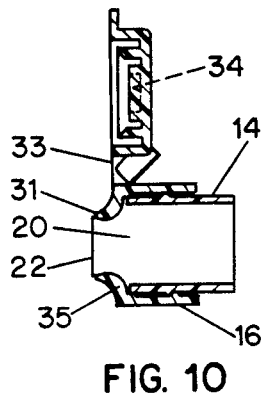
FIG. 10 is a sectional view from the side of the FIG. 9 nozzle.

With reference to FIG. 9, nozzle 16 is provided with longitudinal grooves 37 along its converging inner wall for retaining the inward sloping sides of the septum 20 residing therein. Such an arrangement maintains the septum 20 within a rigid position within the outlet means 17 and prevents intermixing of the streams at contact points of the assembled septum 20 and outlet means 17. The septum 20 extends to a location preferably 0.005 to 0.010 inches beyond the outlet means opening 23.

The nozzle 16 preferably has a cap 34 connected thereto by a hinge 33 as shown in FIGS. 9 and 10. Cap 34 includes a complimentary engaging means comprising recesses 31a and 22a for receiving respectively nozzle rim 31 and septum edge 22 during closure, so that intermixing of the two substances is prevented once the cap is closed.

As an important aspect of the invention, the outlet means 17 is provided with one or more means for causing the outlet streams to flow toward each other and avoid the otherwise uncontrolled outlet flow which can result in the streams of the two or more materials flowing away from each other as they emerge from the outlet opening. The means may include a tapered septum 20 which divides the outlet, tapered peripheral walls on the outlet means as exemplified by nozzle 16, or a differential surface resistance on the interior walls of the outlet means, such that greater surface resistance is provided on the interior surfaces which are adjacent to other outlet openings than on the peripheral interior surfaces of the outlet means. Thus the surfaces of the septum 20 may be provided with a dull finish, such as by vapor honing, while the interior peripheral surfaces of nozzle 16 remain smooth. As the materials flow over the surfaces there will be greater resistance to the flow over the septum causing the flow of materials to "curl" in the direction of the septum as they emerge from the outlet, whereby the two or more streams of material curl towards each other and converge into a single stream. Alternatively, the interior peripheral surfaces of the outlet means can be treated, e.g. with a lubricant, such as polytetrafluoroethylene or silicone materials to reduce the surface friction of the interior peripheral surfaces as compared to the surface friction of the septum 20.

Figure 11:
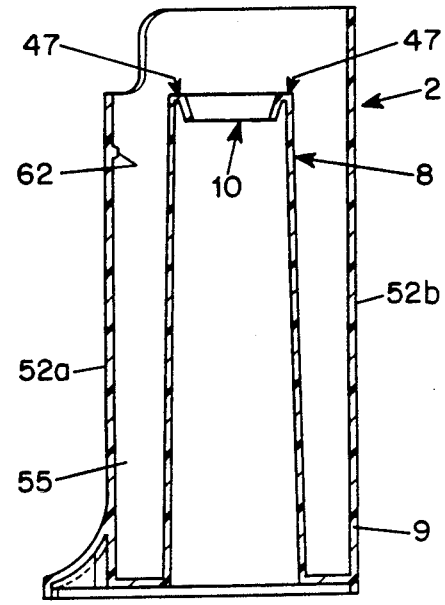
FIG. 11 is a sectional view from the side of a reusable lower body.

Referring once again to FIG. 1, it can be seen that means for selectively engaging reusable base 2, shown as horizontally extending catching ridge 61 protrudes outward from the longitudinal extending ridge 51 on the front side of upper shroud 3. This ridge is used to keep the upper shroud 3 from disengaging from the lower shroud 9 when the dispenser is lifted by the upper shroud 3. As shown in FIG. 11, a corresponding catching rib 62 projects inward from the inside groove 55 of longitudinal extending ridge 52a of lower shroud 9. The two catching ridges engage when the upper and lower shrouds are pulled apart so as to prevent their separation. Referring back to FIG. 1, it can be seen that two vertically oriented slots 65 are formed on either side of catching ridge 61. This makes the area around catching ridge 61 relatively flexible such that when the area 64 above it is pressed upon by a thumb or finger, catching ridge 61 moves inward sufficiently so that it will not engage with catching ridge 62 when refill cartridge 1 is pulled apart from reusable base 2. This allows the refill cartridge to be removed from the reusable base when it has been emptied so that it may be replaced with a full cartridge.

As an alternative to the vertical slots 65, the area around the catching ridge 61 may be made sufficiently flexible by making it thinner than the rest of the upper shroud 3.

Figure 12:
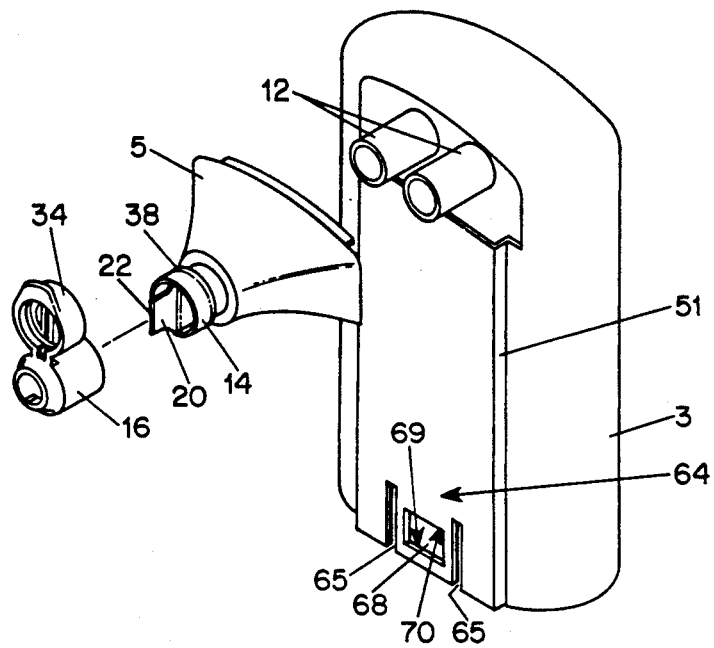
FIG. 12 is a perspective view of a refill cartridge with a window.

As an alternative to the catching ridge 61, upper shroud 3 may be provided with a window 68 as shown in FIG. 12. In this embodiment the lower edge 69 of the windows serves as a means for selectively engaging the reusable base 2 via catching ridge 62. Once again vertical slots 65 on either side of the window 68 make the area relatively flexible such that when area 64 is pressed upon by a thumb or finger, the lower edge 69 moves inward sufficiently so that it will not engage the catching ridge 62 when refill cartridge 1 is pulled apart from reusable base 2. The upper edge 70 of the window is beveled so that it does not prevent the relative compression of the refill cartridge 1 and the reusable base 2.

Figure 13:
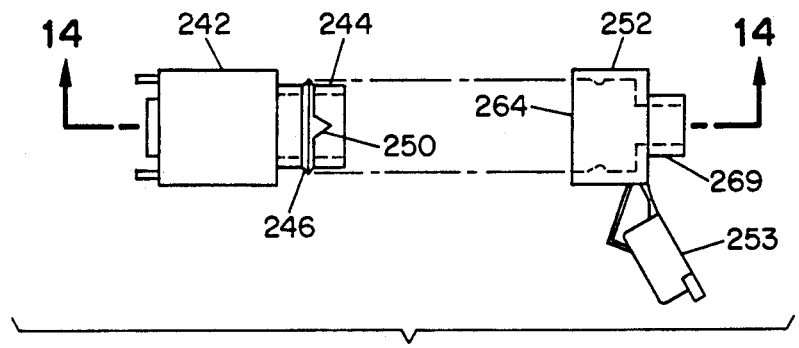
FIG. 13 is an alternate two piece outlet assembly.
Figure 14:
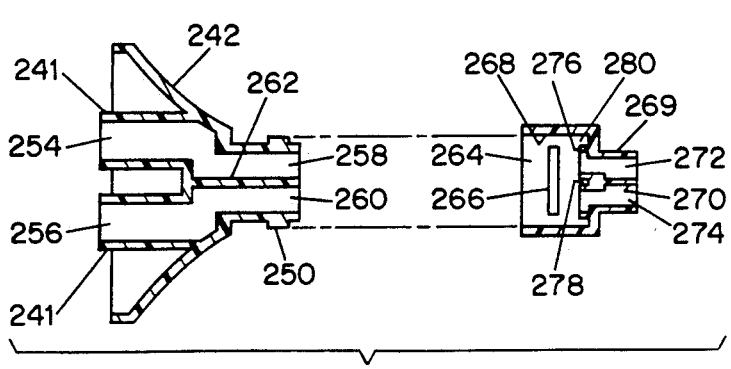
FIG. 14 is a cross-sectional view of the FIG. 13 outlet assembly.
Figure 15:
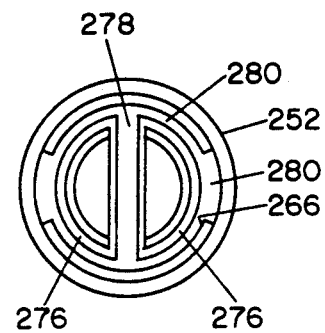
FIG. 15 is an enlarged interior end view of the nozzle member of the outlet of FIG. 13.

A preferred embodiment of outlet assembly 5 is shown in FIGS. 13, 14 and 15. Outlet assembly 5, as shown in FIGS. 7 and 8, includes a projecting thin septum 20, which may pose difficulties in fabrication. In the alternate embodiment of FIGS. 13 through 15 the outlet assembly 5 is fabricated of connecting part 242 and nozzle member 252, and the use of a thin projecting septum is eliminated.

Connecting part 242 includes a housing arrangement similar to that of part 5 which engages projecting outlets 12 of the refill cartridge and includes sleeves 241 which have internal passages 254 and 256. A cylindrical extension 244 of connecting part 242 includes an interior septum 262 extending to the forward end thereof and separating internal outlet passages 258 and 260 which are respectively connected to inlet passages 254 and 256.

A separate nozzle member 252 is arranged to snap fit over cylindrical extension 244 of connecting part 242. To facilitate the snap fit in an appropriate rotational orientation, cylindrical extension 244 is provided with an engaging rib 246 and triangular shaped locating protrusions 250. Nozzle member 252 has a recess portion 264 with an interior rib 266, shown in FIG. 14 which is engaged by rib 246. As shown in FIG. 15 interior rib 266 only extends partially around the peripheral nozzle member 252 whereby gaps are formed to receive triangular locating ridge 250 to assure appropriate angular orientation of nozzle member 252 when is fitted over extension 244. Nozzle member 252 includes a nozzle portion 269, which is circular in cross-section and includes septum 270 which bifurcates nozzle 269 into channels 272 and 274. Septum 270 is preferably tapered and textured as described above and extends to the outlet opening of nozzle member 252. The interior ends of channels 272 and 274 within recess 264 include projecting ribs 276 which form grooves 280 and 278 for receiving respectively the edges of the peripheral walls of extension 244 and septum 262. Tapered ridges 268 on the interior wall of recess 264 are arranged to press the peripheral edges of extension 244 of member 242 into close fit with ridges 276. In an exemplary embodiment four such tapered ridges are provided at equal spacing around recess 264.

Nozzle member 252 is provided with a snap fit cap pivotally mounted thereto having a configuration similar to cap 34.

When assembled, the peripheral edges of channels 258 and 260 are guided into the proper orientation of grooves 280 and 278 by triangular ridges 250 acting in conjunction with interior ridges 266. When fully inserted ridge 266 snaps behind ridge 246 and the forward edges of extension 244 are pressed close to projections 276 by ribs 268, forming a close fit between outlet passages 258 and 260 of connecting part 242 and passages 272 and 274 of nozzle member 252.

While there have been described what are believed to be the preferred embodiment of the present invention, those skilled in the art will recognize that other changes and modifications may be made thereto without departing from the spirit of the invention and it is intended to claim all such changes and modifications as fall within the true scope of the invention.

I claim:

1. A multi-cavity dispensing refill cartridge, for use with a reusable base unit, for the coextrusion of at least two flowable materials, comprising:

a dispensing cartridge comprising at least two hollow and separate parallel cylinders, each cylinder for containing one of said flowable materials, said cylinders having a first generally closed end and a second open end telescopically and slidingly accommodating at least two parallel piston heads which conform to ride sealingly along the interior walls of said cylinders so as to force said flowable materials to flow toward said first end of said cylinders upon relative compression of said cylinders and piston heads, said piston heads each having a hollow interior containing a cylindrical central portion and interior ribs connecting said cylindrical central portion to the outer wall of said piston head, wherein said cylindrical central portion extends beyond said ribs toward said open end of said cylinder whereby a hollow cylindrical piston rod in a reusable base unit can be received around said cylindrical central portion and bear axially against said ribs to push said piston head toward said closed end, said cylinders having outlet channels at said closed end, said refill cartridge further comprising means for selectively engaging a reusable base unit; and an outlet means in fluid communication with said outlet channels, said outlet means including adjacent outlet openings unconnected to each other and having means for causing said flowable material to flow toward each other at said outlet openings to form a single banded, unmixed stream of said materials outside of said outlet means.

2. A multi-cavity dispensing refill cartridge according to claim 1 wherein said cylinders are incorporated within an upper shroud, said upper shroud being arranged to closely conform in sliding relation with a lower shroud of a reusable base unit, whereby relative motion between said shrouds is constrained to be substantially linear providing equal linear motions of said piston heads into said cylinders.

3. A multi-cavity dispensing refill cartridge according to claim 2 wherein said means for selectively engaging a reusable base unit comprises a horizontally extending first catching ridge formed on said upper shroud, said horizontally extending first catching ridge being sized to engage a horizontally extending second catching ridge formed on a lower shroud of a reusable base.

4. A multi-cavity dispensing cartridge according to claim 3 wherein said upper shroud is arranged to closely conform in sliding relation within a lower shroud and wherein said horizontally extending first catching ridge protrudes outward from a relatively flexible portion of said upper shroud so as to be selectively engageable with an inwardly projecting, horizontally extending second catching ridge formed on the inside of a lower shroud whereby when an area above said first catching ridge is pressed upon by a thumb or by a finger, the first catch ridge moves sufficiently inward so that it will not engage a second catching ridge when said refill cartridge is pulled apart from a reusable base.

5. A multi-cavity dispenser according to claim 4 further comprising means for guiding linear motion between said refill cartridge and a reusable base.

6. A multi-cavity dispensing refill cartridge according to claim 5 wherein said means for guiding linear motion between said refill cartridge and a reusable base comprise a longitudinal projecting ridge in said upper shroud which conforms to an inner groove of a lower shroud for guiding said linear motion.

7. A multi-cavity dispensing refill cartridge according to claim 6 wherein said horizontally extending first catching ridge is formed on said longitudinal projecting ridge of said upper shroud so as to be selectively engageable with a horizontally extending second catching ridge formed on an inner groove of a lower shroud.

8. A multi-cavity dispensing refill cartridge according to claim 7 wherein said upper shroud has two longitudinal projecting ridges of different widths whereby said two longitudinal projecting ridges serve to properly orient said dispensing refill cartridge in a reusable base unit having two corresponding inner grooves of appropriate widths.

9. A multi-cavity dispensing refill cartridge according to claim 8 wherein said upper shroud defines vertically oriented slots on either side of said horizontally extending first catching ridge.

10. A multi-cavity dispensing refill cartridge according to claim 4 wherein said relatively flexible portion of said upper shroud is thinner than the rest of said upper shroud.

11. A multi-cavity dispensing refill container according to claim 5 wherein said upper shroud defines vertically oriented slots on either side of said horizontally extending first catching ridge.

12. A multi-cavity dispensing refill cartridge according to claim 8 wherein said horizontally extending first catching ridge is formed on a front side of said refill cartridge.

13. A multi-cavity dispensing cartridge according to claim 2 wherein said means for selectively engaging a reusable base unit comprises a window having a lower edge formed in a relatively flexible portion of said upper shroud so as to be selectively engageable with a catching ridge formed on a lower shroud whereby when an area above said window is pressed on by a thumb or a finger, the window moves so that it will not engage a catching ridge formed on a lower shroud.

* * * * *

UNITED STATES PATENT AND TRADEMARK OFFICE
CERTIFICATE OF CORRECTION

PATENT NO. : 5,289,949
DATED : March 1, 1994
INVENTOR(S) : James L. Gentile

It is certified that error appears in the above-indentified patent and that said Letters Patent is hereby corrected as shown below:

Title page, item [57], Abstract, line 8, "cause" should read --causes--.
line 10, "include"should read --includes--;
line 13, "provides" should read --provided--.

Title page, page 2, col. 1, line 6, "6/1072 should read --6/1972--.
line 8, "3,721,848 should read --3,731,848--.

Col. 4, line 52, "out" should read --outlet--.
Col. 5, line 34, "complimentary" should read --complementary--.
Col. 6, line 67, "is" should read --it is--.

Signed and Sealed this

Thirtieth Day of August, 1994

BRUCE LEHMAN

Attest:

Attesting Officer

*Commissioner of Patents and Trademarks*